United States Patent [19]
Dechirot

[11] Patent Number: 4,797,819
[45] Date of Patent: Jan. 10, 1989

[54] SYSTEM FOR DETERMINING REPLENISHMENT NEEDS ON A PRODUCT DISPLAY BY MEASURING VACANT SPACE

[75] Inventor: Jean-Pierre Dechirot, Balan, France

[73] Assignee: Societe Vynex SA, France

[21] Appl. No.: 866,490

[22] PCT Filed: Aug. 28, 1985

[86] PCT No.: PCT/FR85/00232
§ 371 Date: Apr. 29, 1986
§ 102(e) Date: Apr. 29, 1986

[87] PCT Pub. No.: WO86/01386
PCT Pub. Date: Mar. 13, 1986

[30] Foreign Application Priority Data
Aug. 31, 1984 [FR] France ............... 84 13598

[51] Int. Cl.[4] .............. G06F 15/24; G06M 9/00; G01D 5/28; G01S 15/08
[52] U.S. Cl. ................. 364/403; 73/290 V; 235/385; 377/3; 377/6
[58] Field of Search ............... 221/2, 4; 377/3, 6, 377/8; 364/479, 403; 235/385; 73/290 V

[56] References Cited
U.S. PATENT DOCUMENTS

| | | | |
|---|---|---|---|
| 3,348,030 | 10/1967 | Krause | 377/6 |
| 3,651,478 | 3/1972 | Shandlay | 364/900 |
| 3,784,027 | 1/1974 | Gold | 211/184 |
| 3,902,633 | 9/1975 | Spengler | 221/7 |
| 3,965,340 | 6/1976 | Renner et al. | 377/3 X |
| 4,081,889 | 4/1978 | Levine | 29/25.35 |
| 4,210,969 | 7/1980 | Massa | 73/290 V X |
| 4,351,440 | 9/1982 | Thalenfeld | 211/57.1 |
| 4,417,351 | 11/1983 | Williamson et al. | 377/8 |
| 4,470,299 | 9/1984 | Soltz | 73/290 V |
| 4,496,831 | 1/1985 | Swarz et al. | 235/472 |
| 4,638,872 | 1/1987 | Park et al. | 175/46 |
| 4,639,875 | 1/1987 | Abraham et al. | 364/479 |
| 4,673,932 | 6/1987 | Ekchian et al. | 235/385 X |
| 4,674,073 | 7/1987 | Naruse | 367/105 |

OTHER PUBLICATIONS

Lakhani, A. H., et al., "A New Dimension in Data Capture", 319 Systems Technology, Sep. 15, 1972, 9–12.

Primary Examiner—Jerry Smith
Assistant Examiner—Clark A. Jablon
Attorney, Agent, or Firm—Lerner, David, Littenberg, Krumholz & Mentlik

[57] ABSTRACT

The replenishment quantity for each article on a sales display is determined from the measurement of the length lefton the peg, this measurement being performed by means of either: (a) a gun which comprises an ultrasonic emitting device and an ultrasonic receiving device, these being housed in slidably adjustable mounting bezels, an aiming arrangement consisting of a lamp, a reflecting chamber, a lens, a color imparting filter and reflective ducts, as well as a rear-mounted display and a front-mounted nose, the latter being provided with ducts, a reflective tube and a recessed hooking-on component; or (b) a portable marking indicia reader which reads marking indicia placed on the sales display itself. These devices are connected, via suitable interface to a microcomputer which computes the replenishment quantity based upon the product parameters associated with the particular product and the vacant space on the peg. This microcomputer is linked to a central processing unit, a printer, a mini-cassette reader and a telephone-type acoustic coupler.

28 Claims, 3 Drawing Sheets

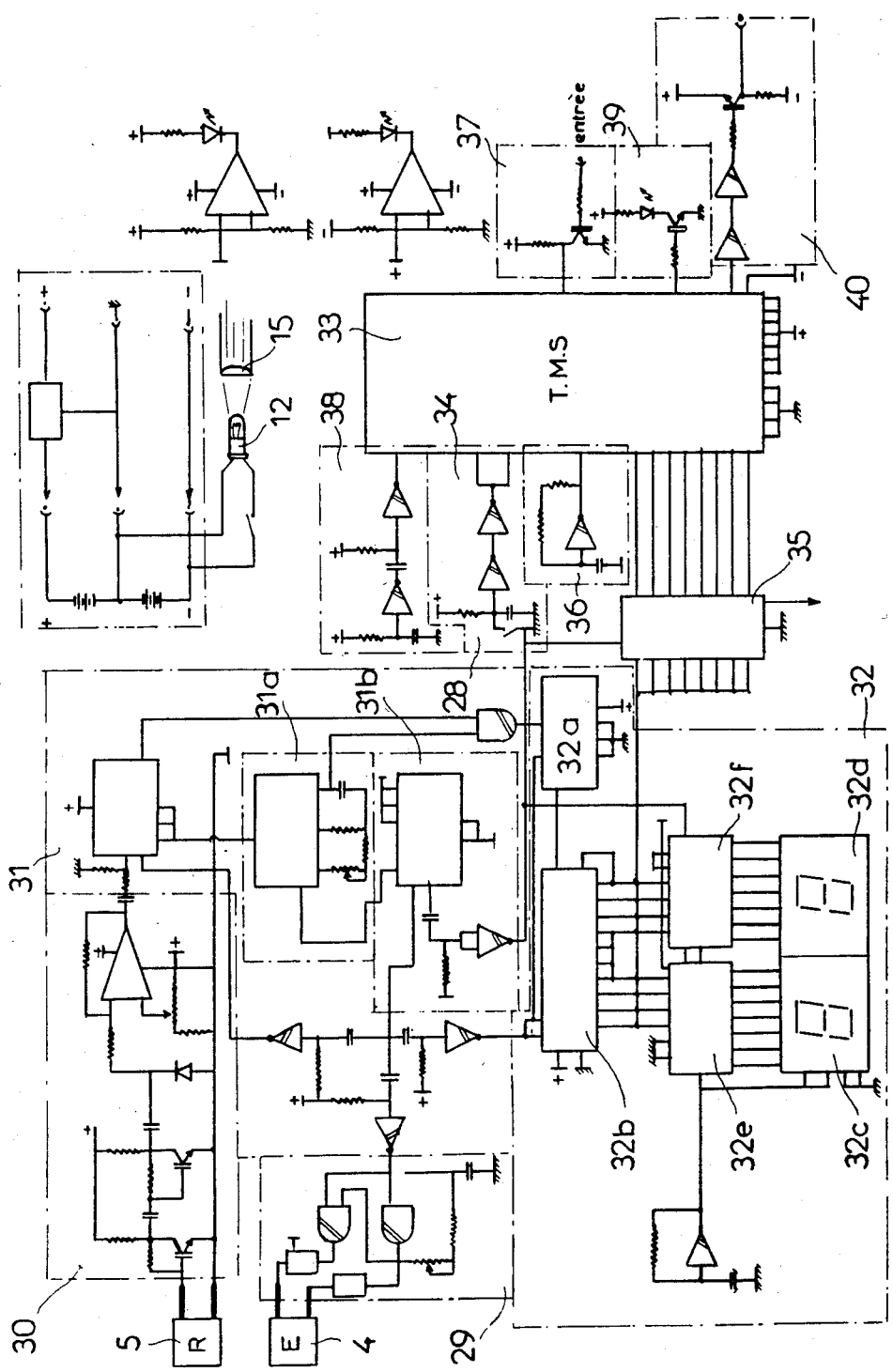
FIG_4

SYSTEM FOR DETERMINING REPLENISHMENT NEEDS ON A PRODUCT DISPLAY BY MEASURING VACANT SPACE

The invention relates to a procedure and a system for the automatic, computerized replenishment of products which are packaged in bags, or on cards, or in boxes, and which are hung, by means of perforated tabs, on pegs which form part of sales display facilities, as are installed in self-service stores, this procedure and system permitting the replenishment quantity to be determined for each article, from the length which is left vacant on the peg, thru the utilization of a suitable sensor and a microcomputer.

The method which is most commonly utilized at present, both for inventory evaluation and for determining what reordering action should be taken, involves reading the bar code or other alphanumeric identification codes appearing on one of the packages of each product—for example with the aid of a pencil-type reader—counting, in the traditional way, the number of packages remaining on each peg, and recording these data, which are then transmitted to the central unit, generally via an acoustic coupler.

This solution presents the disadvantage of being lengthy and tedious, and of permitting counting errors which are liable to manifest themselves as inventory exhaustion situations or as excessive inventories, which are very detrimental.

However, a replenishment procedure and replenishment system corresponding to the preamble of claim 1 (Patent document FR-A-No. 2.139.208) are already known. The pegs are U-shaped and include, on their lower limbs, a plurality of color-coded sections which are arranged side by side, each corresponding to a defined number of bags, so that the inventory can be taken by looking at the sections which have been rendered visible by the removal of bags. The corresponding data are input to a calculator which automatically determines the quantities of goods to be ordered. In reality, this procedure and system only facilitate the counting, by eye, of the number of packages to be replenished, while allowing the risk of human error to remain.

Another replishment procedure and system, corresponding to the preamble of claim 1 (U.S. Pat. No. 3,651,478) is also known, utilizing an optical device which supplies an image of every package which is situated at the end of a row, the image size varying according to how far the package is away, this distance being a function of the quantity of that particular article remaining on the sales display facility. The image is converted into an electrical signal which is then compared with a reference signal corresponding to the shelf, or to a full sales display peg. The result of this comparison is transmitted to a calculator which determines the replenishment quantity for each article. This procedure and system require a fixed installation which in particular calls for the mounting, at a defined distance, of an optical measuring device for each peg, and for the utilization of packages possessing well defined dimensions which have been properly specified.

There also exists, in the technological background (U.S. Pat. No. 3,348,030), an apparatus which enables inventory situations to be displayed and recorded in cases involving products which are hung on rods, such as garments which are presented on coathangers, this apparatus functioning by means of a photoelectric system. A sensor, comprising an illuminating lamp and a photoelectric cell, moves on a support rail which is located just above the rod on which the coathangers are hooked, in sections which are clearly defined for each article. This sensor is driven by a system of cables and an electric motor, and retransmits, to a calculator, a signal which is proportional to the number of articles present in each section. The corresponding quantity is at once retransmitted to a display device and a printer. Movement across the boundary of each section is identified by means of a microswitch which is installed underneath the sensor, and by control fingers which are fixed to the rod, separating the sections. This procedure and system would be difficult to adapt to the replenishment of products which are presented on pegs, in view of the infrastructure which they necessitate, the space which they demand, and the constraints which they would impose in this particular field of application.

The object of the present invention is to remedy the disadvantages which are presented by the abovementioned procedures and arrangements. The invention, as characterized in the claims, solves the problems of automatically determining what reordering actions should be taken, and of determining the inventory situation in points of sale where the products are presented on pegs, as well as the problems involved in the direct execution of calculations, audits, corrections, inventory-taking, etc . . . , starting from physical data which are acquired by utilizing a portable device.

Thus, the length left vacant on each peg is translated directly into the replenishment quantity, this operation being effected by the microcomputer: the data being utilized on the spot and being automatically transmitted to the central replenishment unit. To this end, the microcomputer is linked to a printer, a mini-cassette reader, and a telephone-type acoustic coupler.

According to a first embodiment of the system, enabling the procedure to be utilized, the automatic determination of the replenishment quantity for each article, from the length left vacant on the peg, is performed by means of bar markings which are applied across the width of each peg, along the whole of its usable length, and with the aid of a pencil-type reader which is connected to the microcomputer. This same pencil-type reader will have earlier been utilized for identifying the article which is presented on the peg in question. The best possible method for providing the pegs with bar markings utilizes a preprinted pressure-sensitive adhesive tape.

Since this embodiment requires that the sales display facilities be adapted beforehand, by applying preprinted pressure-sensitive adhesive tape to each peg, it has proved sensible to reserve this embodiment for the utilization of the procedure on newly-manufactured sales display facilities, and to resort to another embodiment of the system in cases where the procedure is to be applied to existing sales display facilities, this latter embodiment involving the utilization of an ultrasonic transceiver for determining the length left vacant on each peg, following identification of the article in question by means of a pencil-type reader which is combined with the said transceiver, and after having pushed all the bags back against the wall of the sales display facility. The time interval separating the transmission and the reception is then a function of the very distance which one is endeavoring to measure.

This ultrasonic transceiver consists of a gun which is capable of transmitting and receiving ultrasound between the end of the hook and the first package, situated at the head of the row.

This gun comprises an aiming-light emitter, consisting of a light source which is combined with a reflecting chamber, a lens, a color-imparting filter, and reflective ducts. The light beam, emitted in this way, enables the path of the waves to be displayed, without any risk of error or interference.

The ultrasonic emitting and receiving devices consist of piezoelectric pellets, housed in sliding mounting bezels which can be adjusted with regard to spacing and alignment, and which are accurately guided by means of small plain pins.

At the rear, the gun is provided with an electronic display, a pilot light which serves as a microcomputer availability indicator, and two pilot lights which indicate the condition of the batteries, while on its side it is provided with a master power supply switch and a switch which controls the power supply to the aiming light and, at the front, with a nose comprising the ducts thru which the ultrasounds pass, a reflective tube thru which the aiming light passes, a recessed component for hooking onto the ends of the pegs, and clips for holding the pencil-type reader.

Pulses are recorded between the transmission and reception of the ultrasounds, and these pulses are counted, are stored in memory, and are transmitted to a microcalculator via a suitable interface, this transmission being effected by operating a trigger, the microcalculator determining the length which has been left vacant between the end of the peg and the first package in the row, and transmitting this information to the microcomputer, which converts it to the replenishment quantity.

This microcomputer is linked to a printer, a minicassette reader and a telephone-type acoustic coupler. The printer enables the order and/or the inventory to be output directly on paper.

The invention provides advantages which amount, in essence, to the fact that it is possible to determine, by automatic means, the quantity of products missing from each peg, and thus to ascertain what products are present, as well as to execute ordering actions on the basis of corrected data; that is to say taking the product reference into account, and making a direct calculation of the quantity to be ordered, after having applied any necessary corrections in accordance with certain data which are concerned with forecasting, if the capacity of the microcomputer allows, in which case the order is transmitted directly to a central unit.

The quantity to be ordered is accordingly a function of the space available on the peg in question, but is compared, in all cases, with the optimum quantity per peg, namely with the maximum quantity, expressed in units of this product, which has to be on the peg once the order has been hung thereon, and which has to be adequate to cover the sales up to the time when the next order will be hung on the peg. The optimum quantity per peg is calculated on the basis of sales histories and is transmitted to the microcomputer which is integrated into the system.

The elements of the system are contained in a small carrying case, which is designed in a way such that the user can easily take out the gun—equipped with its pencil-type reader—or stow it away with equal ease, while the same holds good for the microcomputer which, with the gun, is all that is needed to execute an ordering action. On switching on the electrical power, the pieces of equipment respond to a sequence of test instructions which are designed to ensure that the complete system is operating correctly.

The procedure and system according to the invention are therefore distinguished by the ease with which they can be operated, and by their versatility, since they can be utilized, without any restrictions, on all types of peg employed in sales display facilities, irrespective of the shape and nature of the packages which are hung from these pegs, subject to the sole reservation that the thickness of the said packages will previously have been taken into account in the computing program.

The invention is explained in greater detail below, with the help of drawings which represent the best way to implement it.

FIG. 4 shows the block diagram of the electronic interface which is incorporated into the gun and is located between the ultrasonic-wave transceiver and the microcomputer.

Figure 1:
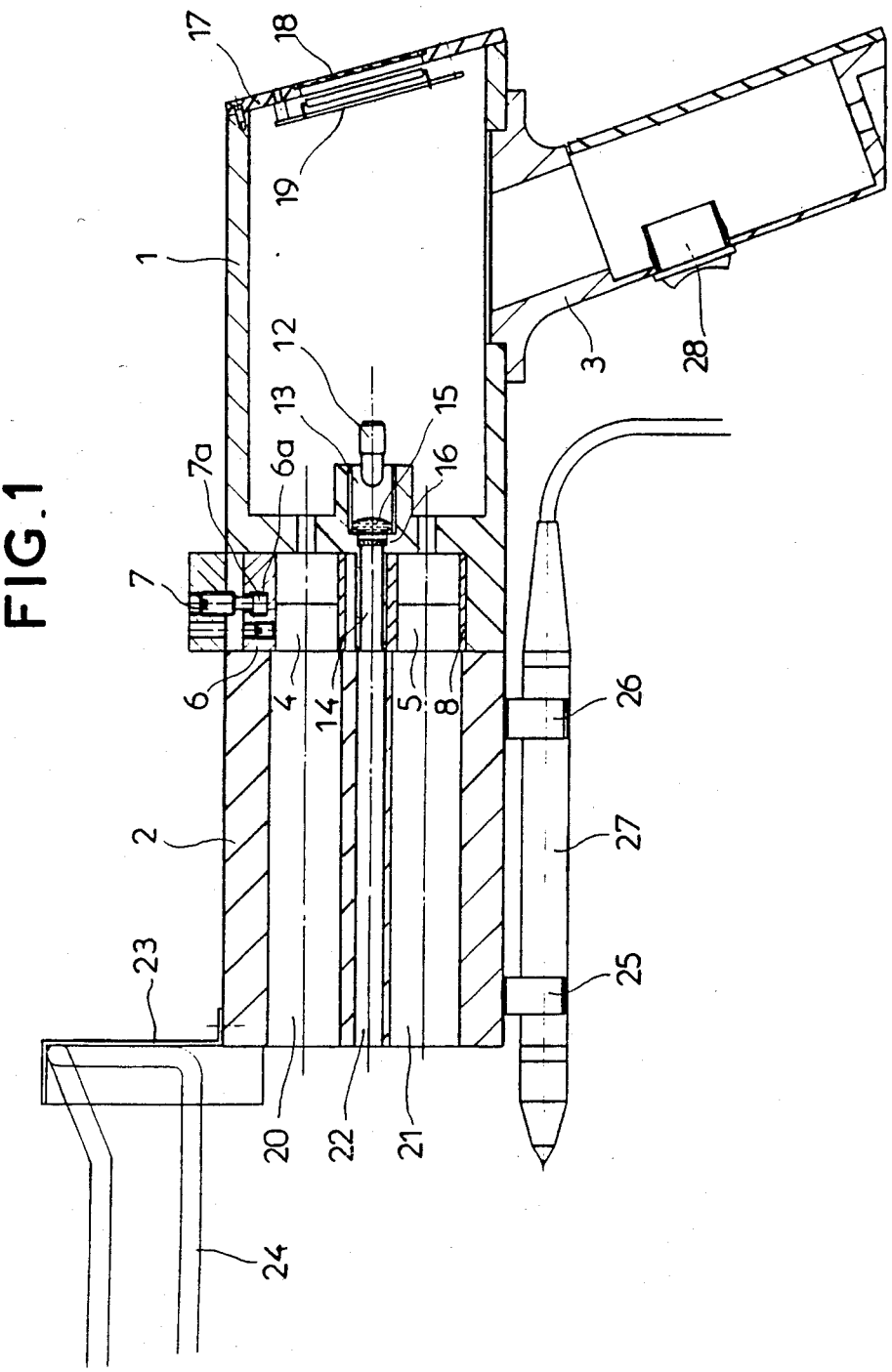
FIG. 1 shows a view, in longitudinal section, of an ultrasonic measuring gun, in place at the end of a peg.
Figure 2:
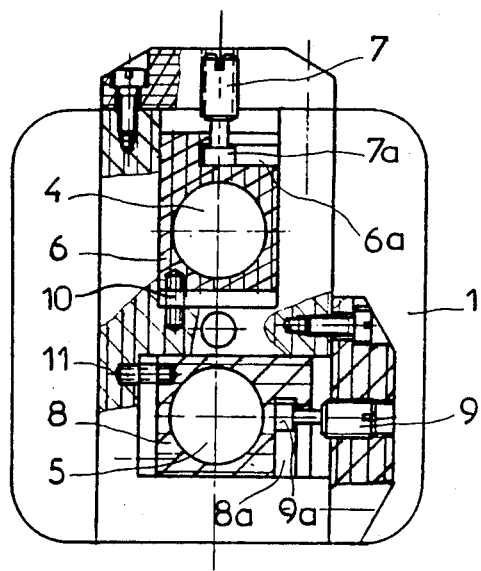
FIG. 2 shows a view, in transverse section, which presents the details of the arrangement for adjusting the positions of the piezoelectric emitting and receiving devices.

On examining FIGS. 1, 2, and 4, it will be noticed that the gun principally comprises a body 1, a spacing nose 2, a grip 3, devices, 4 and 5, which respectively emit and receive ultrasonic waves, a mounting bezel, 6, which slides in order to permit spacing adjustment, with its knurled adjusting screw 7, a mounting bezel, 8, which slides in order to permit alignment adjustment, with its adjusting screw 9, small plain pins, 10 and 11, for guiding the sliding mounting bezels, a light source 12, a reflecting chamber 13, a duct 14, a lens 15 and a color-imparting filter 16, a removable panel 17, supporting an electronic display 18 and a printed circuit 19, ducts, 20 and 21, thru which the ultrasounds pass, a reflective tube 22, thru which the aiming light passes, a recessed component 23 for hooking onto the front of a peg 24, and two clips, 25 and 26, for holding the pencil-type reader 27, a control trigger 28, and an interface which comprises an oscillator 29, a return signal detection module 30, a sequence control module 31, a display module 32, a serial transmission module 33 (marked TMS), a measurement output module 34, a programable memory 35, a clock 36, a measurement output sequencing module 37, an initializing module 38, a microcomputer availability indicator 39, and a microcomputer connector module 40.

Figure 3:
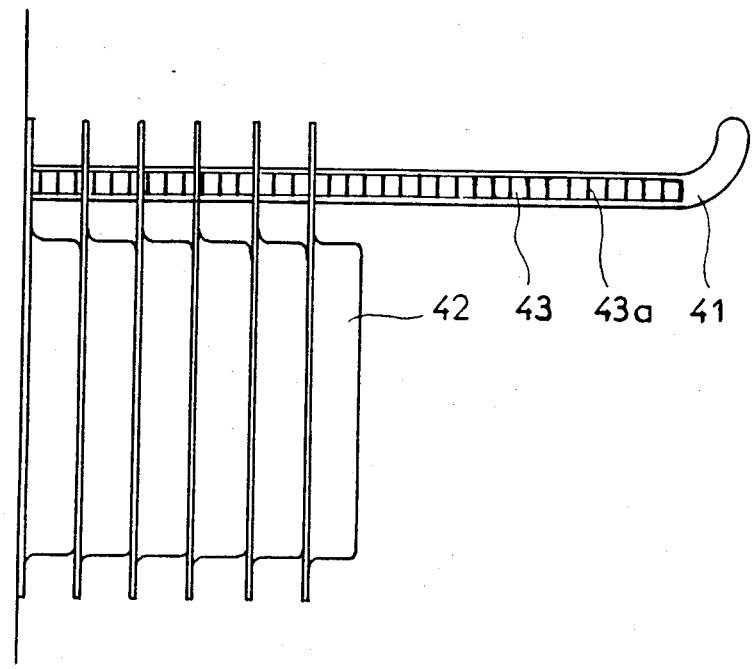
FIG. 3 shows a side view of a peg which has been provided with length measurement bar markings.

Turning now to the examination of FIG. 3, it will be noticed that the principal components of the system utilizing pegs which are provided with length-measuring bar markings are the pegs 41, supporting the packages 42, and an adhesive tape 43, exhibiting the said bar markings.

Referring to FIG. 1 and 2, it will be seen that the body 1 is fitted, in front, with the ultrasonic emitting and receiving devices, 4 and 5, the emitting device 4 being mounted in the mounting bezel 6, which slides to permit spacing adjustment by means of the machined screw 7, the end 7a of this screw being located inside a slot, 6a, which is provided in the mounting bezel, while the receiving device 5 is mounted in the mounting bezel 8, which slides to permit alignment adjustment by means of the machined screw 9, the end 9a of this screw being located inside a slot, 8a, which is provided in the mounting bezel 8. The two sliding mounting bezels, 6 and 8, are kept accurately supported in their slideways by means of small plain pins 10 and 11. The front of the body 1 also includes the arrangement which emits the aiming light, consisting of the light source 12, which is fixed at the entrance to the reflecting chamber 13, said chamber being fitted with the lens 15 and being extended by the duct 14, which is provided with the color-imparting filter 16. The rear of the body 1 is provided with the detachable panel 17, supporting the electronic display 18, the printed circuit 19, the pilot light which acts as a microcomputer availability indicator and two pilot lights which indicate the condition of the electronics power supply batteries, while a master power supply switch and a switch controlling the power supply to the aiming light 12 are provided on the side.

The nose 2, extending the body 1 in the forward direction, comprises the ducts 20 and 21, thru which the ultrasounds pass, as well as the reflective tube 22, thru which the aiming light passes: the recessed component 23, intended to receive the front of the peg 24, being mounted on the top of this spacing nose 2, at the front, while the clips 25 and 26, for holding the pencil-type reader 27, are mounted underneath.

The grip 3, which is fixed underneath the body 1, is provided with the trigger, 28, which controls the data transfer to the microcomputer. It is made hollow in order to allow passage of the serial transmission and electrical power cables.

Referring now to the diagram corresponding to FIG. 4, it will be seen that the emitting device 4 and the receiving device 5 are both connected to the sequence control module 31, the former via the oscillator 29 and the latter via the return signal detection module 30, the sequence control module 31 comprising a time base clock 31a and a memory 31b, dedicated to the distance counting process, and being connected to the display module 32, which comprises a counter 32a and a memory, 32b, which is connected, via decoders 32e and 32f, to two seven-segment electronic display devices 32c and 32d, of the liquid crystal type. The sequence control module 31 and the display module 32 are connected to the serial transmission module 33 (marked TMS), via the measurement output module 34 and the programable memory 35.

The serial transmission module 33 is connected to the clock 36, to the measurement output sequencing module 37, to the initializing module 38, to the microcomputer availability indicator 39 and, via the module 40, to the microcomputer.

Since, as this diagram shows, the measuring system possesses an ultrasonic gun and is equipped with a piezoelectric emitting device 4 and a piezoelectric receiving device 5, the transmitter module 29 consequently needs only to output a very brief signal to the emitting device 4 in order to bring about the transformation of this signal, by this device, into acoustic vibrations within the ultrasonic range, and for them to be returned to the receiving device 5 by the obstacle which is constituted by the first package of a row.

Since the counting system is initialized at the time of the emission, this counting process continues until an echo reaches the receiving device 5.

The number of pulses recorded by the memory 32b during this counting process is transferred to the counter 32a and is simultaneously displayed, on the display devices 32c and 32d, and stored in the memory 35. These values, recorded if demanded by the microcomputer, are transmitted to a microcalculator which determines the vacant length existing between the end of the peg and the first package.

Referring once again to FIGS. 1 and 2, and in the light of the explanations given above, it will be seen that in order to obtain the measurement indication on the display device, and to cause the microcomputer to take account of the measurement—provided that the microcomputer accepts it—the operator needs only to push the relevant packages back against the wall of the sales display facility, after having first read the bar code with the aid of the pencil-type reader 27, which is fixed underneath the gun, to place the hollow component 23, mounted on the end of the gun nose 2, in position on the end of the peg 24, to check the microcomputer availability by observing the pilot light which is located at the rear of the gun, to operate the master power supply and illumination control switches, to adjust the position of the gun until a lightspot is obtained on the package at the end of the row, and then to press the transfer initiation trigger 28.

This operation need be repeated only as many times as there are pegs on the sales display facility, in order to bring about, as will be obvious, the automatic acquisition, by the microcomputer, of the complete set of data needed for the replenishment calculations.

These data are either processed directly by the microcomputer, or are subsequently retransmitted to the central unit via an acoustic coupler, or via any other device of this general type.

The operator thus has at his disposal, at the data acquisition locations, means whereby he can obtain a list of the products which are to be ordered, with a statement of the prices and the total order value, and since the items of information needed for these calculations are recorded in the microcomputer, together with the corresponding programs, it is also possible for the files to be updated by the central unit when the data are transferred, either immediately or after a delay.

If reference is now made again to FIG. 3, it will be noticed that adhesive tape 43 is applied along the whole of the usable length of the peg 41, which supports the packages 42, this tape 43 bearing regularly spaced bar markings, 43a, which make it possible to measure the distance left vacant between the first package in the row and the end of the tape, utilizing either the same pencil-type reader as the one utilized for decoding the bar code appearing on the packages of the product in question, or some other reading device—the read information being automatically transmitted to the calculator embodied in the microcomputer, as in the previous case.

The procedure and measuring systems according to the invention are intended to be utilized for the automatic replenishment of sales display facilities, as are installed in retail stores, but their advantageous utilization would be possible in other fields as well, particularly for monitoring the positioning or the levels of solid or liquid elements, or for determining such positions or levels, subject to the reservation that the procedure and systems first be adapted.

What is claimed is:

1. A system for the automatic determination of the quantity of product units required to replenish the inventory on a sales display including a plurality of pegs projecting therefrom, each of said plurality of pegs including a first end mounted to a display surface and a second end projecting therefrom, whereby each of said plurality of pegs can carry a predetermined maximum number of said product units thereon and said quantity of product units required to replenish the inventory of each of said plurality of pegs is a function of the distance between said second ends of said plurality of pegs and the remaining plurality of said product units on each of said plurality of pegs, said system comprising marking indicia applied along substantially the entire length of each of said plurality of pegs, portable marking indicia reading means for reading said marking indicia so as to determine said distance between said second ends of said plurality of pegs and said remaining plurality of said product units on each of said plurality of pegs, and microcomputer means connected to said portable marking indicia reading means for automatically converting said determined distance into said quantity of product units by using product parameter data associated with said product units required to replenish the inventory on each of said plurality of pegs.

2. The system according to claim 1, wherein said marking indicia comprises preprinted marking indicia disposed on a pressure-sensitive adhesive tape.

3. The system according to claim 1 wherein said marking indicia comprises bar markings and said portable marking indicia reading means comprises a pencil-type reader.

4. The system according to claim 1 wherein said portable marking indicia reading means comprises means for applying said portable marking indicia reading means to said marking indicia and determining said distance between said second ends of said plurality of pegs and said remaining plurality of said product units on each of said plurality of pegs by moving said portable marking indicia reading means from said second end of said plurality of pegs to the position of said remaining plurality of said product units on each of said plurality of pegs.

5. The system according to claim 1 further comprising product indicia representing the product carried on each of said plurality of pegs, said portable marking reading means being adapted for reading said product indicia.

6. The system according to claim 5 further comprising coupling means and central processing means, said coupling means being capable of communicating the data obtained by said microcomputer means to said central processing means, whereby said central processing means may be utilized to supply said replenishment needs.

7. A system for the automatic determination of the quantity of product units required to replenish the inventory on a sales display including a plurality of pegs projecting therefrom, each of said plurality of pegs including a first end mounted to a display surface and a second end projecting therefrom, whereby each of said plurality of pegs can carry a predetermined maximum number of said product units thereon and said quantity of product units required to replenish the inventory of each of said plurality of pegs is a function of the distance between said second end of said plurality of pegs and the remaining plurality of said product units on each of said plurality of pegs, said system comprising ultrasonic transceiver means capable of determining said distance between said second ends of said plurality of pegs and said remaining plurality of said product units on each of said plurality of pegs, and microcomputer means connected to said ultrasonic transceiver means for automatically converting said determined distance into said quantity of product units by using product parameter data associated with said product units required to replenish the inventory on each of said plurality of pegs.

8. The system according to claim 7 wherein said ultrasonic transceiver means includes emitting means for emitting ultrasound and receiving means for receiving said ultrasound for determining said distance between said second end and said remaining plurality of said product units on each of said plurality of pegs.

9. The system according to claim 8 wherein said emitting means and said receiving means comprise piezoelectric means.

10. The system according to claim 8 including mounting bezel means for adjustably mounting said emitting means and said receiving means.

11. The system according to claim 10 including screw means for adjusting said mounting bezel means.

12. The system according to claim 11 further including guide pin means for guiding said adjustment of said mounting bezels means by said screw means.

13. The system according to claim 7 including a portable marking indicia reading means linked to said microcomputer means.

14. The system according to claim 13 including product indicia representing the product carried on each of said plurality of pegs, said portable marking indicia reading means being adapted for reading said product indicia.

15. The system according to claim 13 wherein said product indicia are disposed on each of said product units.

16. The system according to claim 13 wherein said product indicia are disposed on each of said plurality of pegs.

17. The system according to claim 13 wherein said portable marking indicia reading means comprises a pencil-type reader.

18. The system according to claim 13 including holding means for holding said portable marking indicia reading means in a predetermined location with respect to said ultrasonic transceiver means.

19. The system according to claim 7 wherein said ultrasonic transceiver means includes light emitting means for aiming said ultrasonic transceiver means.

20. The system according to claim 19 wherein said light emitting means comprises a light source and light directing means for directing said light emitting from said light source towards a predetermined target.

21. The system according to claim 20 wherein said light directing means includes an elongated reflecting chamber and lens means.

22. The system according to claim 21 wherein said light emitting means further includes color imparting filter means.

23. The system according to claim 20 including power supply means for said light emitting means, and switch means for controlling said power supply means.

24. The system according to claim 7 wherein said ultrasonic transceiver means includes electronic display means.

25. The system according to claim 24 wherein said ultrasonic transceiver means includes a power source, first pilot light means connected to said power source for indicating the condition of said power source and second pilot light means connected to said microcomputer means for indicating the availability of said microcomputer means.

26. The system according to claim 7 including mounting means for mounting said ultlrasonic transceiver means at said second end of said plurality of pegs.

27. The system according to claim 26 wherein said mounting means comprises recessed hook means.

28. The system according to claim 7 wherein said ultrasonic transceiver means includes pulse emission means for emitting pulses whereby said pulses can be aimed at said remaining plurality of said product units on each of said plurality of pegs and bounced off said remaining plurality of said product units, receiver means for receiving said pulses which have bounced off said remaining plurality of said product units, counting means for counting said pulses received by said receiver means, memory means for storing pulses converted by said counting means, and interface means for transmitting said pulses counted by said counting means to said microcomputer means.

* * * * *

UNITED STATES PATENT AND TRADEMARK OFFICE
CERTIFICATE OF CORRECTION

PATENT NO.   : 4,797,819

DATED        : January 10, 1989

INVENTOR(S)  : Jean-Pierre Dechirot

It is certified that error appears in the above-identified patent and that said Letters Patent is hereby corrected as shown below:

Column 10, line 6, after "storing" insert --said--.

Signed and Sealed this

Twenty-first Day of November, 1989

Attest:

JEFFREY M. SAMUELS

*Attesting Officer*    *Acting Commissioner of Patents and Trademarks*